(12) United States Patent
Elliston et al.

(10) Patent No.: US 9,370,834 B2
(45) Date of Patent: Jun. 21, 2016

(54) SAW BLADE WITH FEED LIMITER

(71) Applicant: IRWIN INDUSTRIAL TOOL COMPANY, Huntersville, NC (US)

(72) Inventors: Asif Elliston, Springfield, MA (US); William B. Korb, Broad Brook, CT (US); Stephen A. Hampton, East Longmeadow, MA (US); Douglas K. Fosberg, Wilbraham, MA (US); Charles E. Kalomeris, East Longmeadow, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 280 days.

(21) Appl. No.: 13/803,588

(22) Filed: Mar. 14, 2013

(65) Prior Publication Data

US 2014/0260882 A1 Sep. 18, 2014

(51) Int. Cl.
*B27B 33/14* (2006.01)
*B23D 61/12* (2006.01)

(52) U.S. Cl.
CPC ........... *B23D 61/121* (2013.01); *Y10T 83/9319* (2015.04); *Y10T 83/9348* (2015.04)

(58) Field of Classification Search
CPC .. B23D 61/121; B23D 61/04; Y10T 83/9319; Y10T 83/9348
USPC .................................................. 83/835–855
See application file for complete search history.

(56) References Cited

U.S. PATENT DOCUMENTS

| | | | |
|---|---|---|---|
| 23,330 A | 3/1859 | Wilson | |
| 105,261 A | 7/1870 | Shailer | |
| 434,352 A * | 8/1890 | Miller | 83/848 |
| 493,687 A | 3/1893 | Dean | |
| 820,969 A | 5/1906 | Grelck | |
| 1,381,478 A | 6/1921 | Lawrence | |
| 1,381,930 A | 6/1921 | Morgan | |
| 1,771,722 A | 7/1930 | Prentice | |
| 2,568,870 A | 9/1951 | Ronan | |
| 3,171,457 A | 3/1965 | Brown | |
| 3,792,524 A | 2/1974 | Pomernacki | |
| 3,866,504 A * | 2/1975 | Claesson et al. | 83/852 |
| 4,339,977 A | 7/1982 | Miller | |
| 4,557,172 A | 12/1985 | Yoneda | |
| 4,727,788 A | 3/1988 | Yoshida et al. | |
| 4,813,324 A | 3/1989 | Yoshida et al. | |
| 4,827,822 A | 5/1989 | Yoshida et al. | |

(Continued)

FOREIGN PATENT DOCUMENTS

WO WO2012/003378 A2 1/2012

OTHER PUBLICATIONS

Patent Examination Report No. 1, Australian Patent Application No. 2014201370, Date of Issue: Apr. 23, 2015, Australian Government IP Australia.

*Primary Examiner* — Omar Flores Sanchez
(74) *Attorney, Agent, or Firm* — Sutherland Asbill & Brennan LLP

(57) ABSTRACT

A saw blade including cutting teeth, having at least one of chip-limiters protruding from the teeth or secondary teeth in the gullets of the cutting teeth configured to mitigate the blade from over-feeding. The chip limiters and/or secondary teeth provide that only a limited portion of an object that the saw blade encounters during cutting falls below the cutting tips of the cutting teeth. The chip limiters and/or secondary teeth also assist the cutting teeth in cutting.

12 Claims, 6 Drawing Sheets

(56) References Cited

U.S. PATENT DOCUMENTS

| | | |
|---|---|---|
| 4,958,546 A * | 9/1990 | Yoshida et al. ............... 83/848 |
| 5,094,135 A | 3/1992 | Nakahara et al. |
| 5,331,876 A * | 7/1994 | Hayden, Sr. ............... 83/661 |
| 5,410,935 A | 5/1995 | Holston et al. |
| 5,425,296 A | 6/1995 | Kullmann et al. |
| 5,477,763 A * | 12/1995 | Kullman ............... 83/846 |
| 5,603,252 A | 2/1997 | Hayden, Sr. |
| 5,606,900 A | 3/1997 | Stoddard |
| 5,832,803 A | 11/1998 | Hayden, Sr. |
| 6,003,422 A | 12/1999 | Holston |
| 6,158,324 A | 12/2000 | Kullmann et al. |
| 6,269,722 B1 * | 8/2001 | Hellbergh ............... 83/661 |
| 6,276,249 B1 | 8/2001 | Handschuh et al. |
| 6,439,094 B1 | 8/2002 | Yoneda et al. |
| 6,532,852 B1 | 3/2003 | Tsujimoto et al. |
| 6,598,509 B2 | 7/2003 | Cook et al. |
| 6,601,495 B2 | 8/2003 | Cranna |
| 6,834,573 B1 | 12/2004 | Nakahara |
| 7,137,316 B2 | 11/2006 | Nicolson et al. |
| 7,174,823 B2 | 2/2007 | Cranna |
| 7,225,714 B2 | 6/2007 | Rompel et al. |
| 7,225,715 B2 | 6/2007 | Lowder et al. |
| 7,568,416 B2 | 8/2009 | Tsujimoto |
| 7,661,347 B2 | 2/2010 | Nagano et al. |
| 7,806,033 B2 | 10/2010 | Kocher et al. |
| 8,113,100 B1 | 2/2012 | Cranna et al. |
| 8,621,972 B2 * | 1/2014 | Nagano ............... 83/846 |
| 2001/0004860 A1 | 6/2001 | Kullmann et al. |
| 2002/0124707 A1 * | 9/2002 | Izard ............... 83/835 |
| 2002/0184981 A1 | 12/2002 | Tsujimoto |
| 2002/0194975 A1 | 12/2002 | Bishop |
| 2003/0121391 A1 | 7/2003 | Knebel |
| 2004/0182218 A1 | 9/2004 | Chao |
| 2004/0255749 A1 | 12/2004 | Hayden |
| 2005/0257660 A1 | 11/2005 | Hayden |
| 2007/0163392 A1 | 7/2007 | Kullmann et al. |
| 2007/0193427 A1 | 8/2007 | Hayden |
| 2007/0221033 A1 | 9/2007 | Taffertshofer |
| 2007/0251372 A1 | 11/2007 | Petts et al. |
| 2008/0121079 A1 | 5/2008 | Hashimoto et al. |
| 2008/0264231 A1 | 10/2008 | Coe et al. |
| 2009/0145280 A1 | 6/2009 | Bucks et al. |
| 2011/0271815 A1 | 11/2011 | Elliston et al. |

\* cited by examiner

SAW BLADE WITH FEED LIMITER

FIELD OF THE INVENTION

The present invention relates to saw blades, and more particularly, to saw blades with chip limiting features to prevent over-feeding.

BACKGROUND OF THE INVENTION

A reciprocating saw machine is a hand-held power saw that includes a chuck for releasably engaging the saw blade and driving the saw blade in a reciprocating motion through a work piece. The reciprocating motion can be an orbital cutting action, a straight or linear cutting action, or an angled cutting action. The length or stroke of the reciprocating motion is typically about 1½ inches or less. Reciprocating saws are sometimes referred to as "recip" saws, jig saws, and power hack saws, and the term reciprocating saw is used herein without limitation to mean reciprocating saw machines, jigsaw machines, and portable power hack machines. Reciprocating saws typically are driven by electric motors (e.g., cord or cordless saws) or are pneumatically driven. Well-known reciprocating saws are sold under the brand names "Sawzall™" by Milwaukee Electric Tool Corporation and "Tiger Saw™" by Porter-Cable Corporation.

A typical reciprocating saw blade includes a blade portion having a cutting edge defined by a plurality of teeth axially spaced relative to each other along one side of the blade, and a non-working edge formed on an opposite side of the blade relative to the cutting edge. A tang for releasably connecting the blade to the chuck of a reciprocating saw extends from an inner end of the blade. The term "recip blade" or "reciprocating saw blade" is used herein to mean a blade configured for use in a reciprocating saw, but is not limited to any particular configuration of blade or use in a particular saw.

A typical reciprocating saw blade intended for cutting soft materials such as wood, including composite or bi-metal blades, is designed to cut fast and aggressively. Aggressive cutting tooth forms along with a large pitch (typically 2 to 8 teeth per inch) are used for this purpose. However, such blades are susceptible to failure upon encountering an occasional hard material, such as a, nail or screw (typically having a diameter of at least about 40% of the tooth pitch) or staple when the hard material falls too far into a tooth gullet beyond the end of a tooth tip. This type of failure can also occur with the cutting of pipes or materials where the cut cross-section changes depending on the blade's location within the cut e.g. on a pipe where the cut cross-section is wide at the top and then is drastically reduced as the saw approaches the cross-section that is perpendicular to the cutting direction. This could be the side walls of a round pipe, a rectangular tube or any structural work piece. If the wall thickness (or the dimension of the material in the cutting direction) becomes less than the tooth pitch, the saw could overfeed. This "over-feeding" of the hard material, forces the trailing tooth to cut a large portion of the hard material, thus forcing a bigger chip load than the trailing tooth can handle. Under these circumstances, the tooth may not withstand the resultant shearing force, resulting in fracture. Additionally, saw stalling may be induced, leading to injury.

Similarly, specialty reciprocating saw blades, such as diamond or carbide tipped blades, are very effective when used for their intended purposes, but perform very poorly if misapplied. The material at the tip of these blades possesses a higher hardness than a typical bi-metal blade, and consequently is also more brittle. This renders such blades susceptible to catastrophic failure when they come in contact with a hard material, such as a pipe, nail, screw or staple, due to their brittleness. In such instance, the tip may fracture, crumble, or rip from the weld or solder with the blade body.

Prior art attempts to solve the problem of tooth fracture upon encountering hard materials include employing blades with varying shallow clearance angles (between 17 degrees and 23 degrees) on alternate teeth, or employing tooth shapes having humps at the end of the primary clearance surface, to prevent hard materials, such as pipes, nails, screws or staples, from falling within the gullet and causing tooth fracture. However, such shallow clearance angles sacrifice cutting efficiency and the life of the blade in exchange for some potential prevention of tooth fracture. Further, the extension of the clearance surface to form the humps can reduce gullet volume, reducing chip removal capacity/efficiency, or require a larger tooth pitch, which reduces cutting capacity/efficiency or requires modification of the teeth to make up the loss, which can further exacerbate the problem of breakage when encountering hard materials.

Prior art attempts to solve this problem for diamond or carbide tipped blades include designing different types of pockets along the blade body for the diamond or carbide tips to reside in, adjusting the parameters for welding and soldering the tips to the blade backing, as well as employing different material grades to impart different shock and impact absorption properties. However, none of these configurations prevent the underlying problem of over-feeding.

SUMMARY OF THE INVENTION

It is an object of the present invention to overcome one or more of the above-described drawbacks and/or disadvantages of the prior art to provide a chip limiter that both protects against over-feeding, while also aiding in the overall cutting efficiency of the blade.

In one aspect, a saw blade comprises a blade body having a back edge, a plurality of cutting teeth defining a cutting edge located on an opposite site of the blade relative to the back edge and a cutting direction, and a plurality of gullets each between successive cutting teeth, each tooth of the cutting teeth configured to cut a material to be cut at least when moved through the material in the cutting direction and defining a tip, a height thereof, at least one clearance surface extending from the tip in a direction opposite the cutting direction, a rake face on an opposite side of the tip relative to the at least one clearance surface and extending from the tip toward a respective gullet, wherein said tips of the cutting teeth define the cutting edge, and a distance along the cutting edge between successive cutting teeth tips in the cutting direction defines a pitch thereof. The saw blade further comprises a plurality of chip limiters, each projecting from a respective trailing tooth in the cutting direction a first distance along the cutting edge from the tip of the respective trailing tooth, wherein each chip limiter defines a tip, a height thereof, a relief surface extending from the chip limiter tip toward the rake face of the respective trailing tooth, and a chip limiter rake face located on the opposite side of the chip limiter tip relative to the relief surface and extending from the chip limiter tip toward said respective gullet. The height of the tooth tip is greater than the height of the chip limiter. The first distance is at least one of (i) within a range of about 22% to about 44% of the pitch and (ii) within the range of about 30% to about 40% of a second distance along the cutting edge, defined between the chip limiter tip and the tip of the respective preceding tooth in the cutting direction. Each chip limiter is configured to (i) upon contact of an object, e.g., a foreign object in the material being cut, with the respective trailing tooth, substantially limit or prevent more than about 50% of the object from protruding beyond the cutting edge toward said respective gullet and (ii) at least partially cut the material that contacts the chip limiter tip.

In some embodiments, the first distance is within a range of about 24% to about 40% of the pitch. In some embodiments, the first distance is within the range of about 22% to about 44% of the pitch, and a height differential between the height of the tooth tip and the height of the chip limiter is within a range of about 8% to about 20% of the pitch. In some such embodiments, the height differential is within a range of about 9% to about 18% of the pitch.

In some embodiments, the first distance is within the range of about 30% to about 40% of the second distance, the second distance is within the range of about 71% to about 77% of the pitch, and a height differential between the height of the tooth tip and the height of the chip limiter is within a range of about 5% to about 18% of the pitch.

In some embodiments, the cutting teeth tips comprise at least one of a coating, carbide, cermet or diamond material. In some such embodiments, a height differential between the height of the tooth tip and the height of the chip limiter is within a range of about 3% to about 10% of the pitch. In yet some such embodiments, the height differential is within a range of about 3% to about 6% of the pitch.

In some embodiments, the chip limiter is configured to substantially prevent more than about 30% of an object, such as a pipe or a metal fastener, e.g., a nail, screw, having a diameter of at least about 40% of the pitch from contacting the respective trailing tooth.

In some embodiments, the at least one clearance surface includes a primary clearance surface defining a primary clearance angle within the range of about 24 degrees to about 37 degrees. In some embodiments, the primary clearance surface spans a clearance surface distance along the cutting edge within the range of about 17% to about 44% of the pitch. In some such embodiments, the clearance surface distance is within the range of about 25% to about 40% of the pitch. In some embodiments, the relief surface defines a relief angle within the range of about 20 degrees to about 37 degrees.

In accordance with another aspect, a saw blade comprises a blade body having a back edge, a plurality of primary cutting teeth defining a cutting edge located on an opposite side of the blade relative to the back edge and a cutting direction, and a plurality of gullets each between successive primary cutting teeth, each tooth of the primary cutting teeth configured to cut a material to be cut at least when moved through the material in the cutting direction and defining a tip, a height thereof, at least one clearance surface extending from the tip in a direction opposite the cutting direction, a rake face on an opposite side of the tip relative to the at least one clearance surface and extending from the tip toward a respective gullet, wherein said primary teeth tips define the cutting edge, a distance along the cutting edge between successive primary teeth tips in the cutting direction defines a primary pitch thereof. Each gullet has a secondary cutting tooth protruding therefrom toward the cutting edge, and defining a secondary cutting tooth tip, and a height thereof. The height of the primary tooth tip height is greater than the height of the secondary tooth tip. The secondary tooth tip is located a first distance along the cutting edge in the cutting direction from the tip of a respective trailing primary tooth, the first distance defining a secondary pitch within a range of about 20% to about 44% of the primary pitch. The secondary cutting tooth is configured to (i) upon contact of an object, e.g., a foreign object in the material, with the respective trailing primary tooth, substantially limit or prevent more than about 50% of the object from protruding beyond the cutting edge toward said respective gullet and (ii) at least partially cut the material that contacts the secondary tooth tip.

In some embodiments, a height differential between the height of the primary tooth tip and the height of the secondary tooth tip is within a range of about 6% to about 30% of the primary pitch. In some such embodiments, the height differential is within a range of about 6% to about 20% of the primary pitch.

In some embodiments, the primary cutting teeth tips comprise at least one of a coating, carbide, cermet or diamond material. In some such embodiments, a height differential between the height of the primary tooth tip and the height of the secondary tooth tip is within a range of about 3% to about 10% of the primary pitch. In some such embodiments, the height differential is within a range of about 3% to about 6% of the primary pitch.

In some embodiments, the secondary cutting tooth is configured to substantially prevent more than about 30% of an object, such as, for example, a pipe or metal fastener, e.g., a nail or screw, having a diameter of at least about 40% of the pitch from contacting the respective trailing primary cutting tooth.

In accordance with another aspect, a saw blade comprises a blade body having a back edge, a plurality of primary cutting teeth defining a cutting edge located on an opposite side of the blade relative to the back edge and a cutting direction, and a plurality of gullets each between successive primary cutting teeth, each tooth of the primary cutting teeth configured to cut a material to be cut at least when moved through the material in the cutting direction and defining a tip, a height thereof, at least one clearance surface extending from the tip in a direction opposite the cutting direction, a rake face on an opposite side of the tip relative to the at least one clearance surface and extending from the tip toward a respective gullet, wherein said primary teeth tips define the cutting edge, a distance along the cutting edge between successive primary teeth tips in the cutting direction defines a primary pitch thereof. Each gullet has at least two secondary cutting teeth including a leading secondary cutting tooth having a leading secondary tooth tip defining a height thereof and a trailing secondary cutting tooth having a trailing secondary tooth tip define a height thereof protruding from the gullet toward the cutting edge. The height of the primary tooth tip is greater than the heights of the leading secondary tooth tip and the trailing secondary tooth tip. The trailing secondary tooth tip is located a first distance along the cutting edge in the cutting direction from the tip of a respective trailing primary tooth, the first distance defining a secondary pitch, and the leading secondary tooth tip is located a second distance along the cutting edge in the cutting direction from the tip of the trailing secondary tooth tip, the second distance defining a tertiary pitch. Each of the secondary pitch and the tertiary pitch is within a range of about 15% to about 35% of the primary pitch. The at least two secondary cutting teeth are configured to (i) upon contact of an object, e.g., a foreign object in the material, with the respective trailing tooth, substantially limit or prevent more than about 50% of the object from protruding beyond the cutting edge toward said respective gullet and (ii) at least partially cut the material that contacts the chip limiter tip.

In some embodiments. a height differential between the height of the primary tooth tip and the heights of the secondary tooth tips is within a range of about 6% to about 30% of the primary pitch. In some such embodiments, the height differential is within a range of about 6% to about 20% of the primary pitch.

In some embodiments, the primary cutting teeth tips comprise at least one of a coating, carbide, cermet or diamond material. In some such embodiments, a height differential between the height of the primary tooth tip and the heights of the secondary tooth tips is within a range of about 3% to about 10% of the primary pitch. In some such embodiments, the height differential is within a range of about 3% to about 6% of the primary pitch.

In some embodiments, the at least two secondary cutting teeth are configured to substantially prevent more than about 30% of an object, such as, for example, a pipe or metal fastener, e.g., a nail or screw, having a diameter of at least about 40% of the pitch from contacting the respective trailing primary cutting tooth.

In accordance with another aspect, a saw blade comprises a blade body having a back edge, a plurality of primary cutting teeth defining a cutting edge located on an opposite side of the blade relative to the back edge and a cutting direction, and a plurality of gullets each between successive primary cutting teeth, each tooth of the primary cutting teeth configured to cut a material to be cut at least when moved through the material in the cutting direction and defining a tip, a height thereof, at least one clearance surface extending from the tip in a direction opposite the cutting direction, a rake face on an opposite side of the tip relative to the at least one clearance surface and extending from the tip toward a respective gullet, wherein said primary teeth tips define the cutting edge, a distance along the cutting edge between successive primary teeth tips in the cutting direction defines a primary pitch thereof. The saw blade further comprises a plurality of first means for substantially limiting or preventing more than about 50% of an object, e.g., a foreign object in the material, from protruding beyond the cutting edge toward said respective gullet upon contact with the respective trailing primary tooth, the first means including second means for at least partially cutting the material that contacts the second means.

In some embodiments, the first means comprises a chip limiter projecting from a respective trailing tooth in the cutting direction a first distance along the cutting edge from the tip of the respective trailing tooth, and the second means comprises a chip limiter tip defining a height thereof, and the chip limiter further defines a relief surface extending from the chip limiter tip toward the rake face of the respective trailing tooth, and a chip limiter rake face located on the opposite side of the chip limiter tip relative to the relief surface and extending from the chip limiter tip toward said respective gullet. The height of the tooth tip is greater than the height of the chip limiter. The first distance is at least one of (i) within a range of about 22% to about 44% of the pitch and (ii) within the range of about 30% to about 40% of a second distance along the cutting edge, defined between the chip limiter tip and the tip of the respective preceding tooth in the cutting direction.

In some embodiments, the first means comprises a secondary cutting tooth, wherein each gullet has a secondary cutting tooth protruding therefrom toward the cutting edge, and the second means comprises a secondary cutting tooth tip, defining a height thereof. The height of the primary tooth tip is greater than the height of the secondary tooth tip. The secondary tooth tip is located a first distance along the cutting edge in the cutting direction from the tip of a respective trailing primary tooth, the first distance defining a secondary pitch within a range of about 20% to about 44% of the primary pitch.

In some embodiments, the first means comprises a secondary cutting tooth and the second means comprises a secondary cutting tooth tip defining a height thereof, wherein each gullet has at least two of said secondary cutting tooth including a leading secondary cutting tooth and a trailing secondary cutting tooth protruding therefrom toward the cutting edge. The height of the primary tooth tip is greater than the heights of the secondary cutting teeth tips. The tip of the trailing secondary tooth is located a first distance along the cutting edge in the cutting direction from the tip of a respective trailing primary tooth, the first distance defining a secondary pitch, and the tip of the leading secondary tooth tip is located a second distance along the cutting edge in the cutting direction from the tip of the trailing secondary tooth, the second distance defining a tertiary pitch. Each of the secondary pitch and the tertiary pitch is within a range of about 15% to about 35% of the primary pitch.

Other objects and advantages of the present invention, and/or of the currently preferred embodiments thereof, will become more readily apparent in view of the following detailed description of the currently preferred embodiments and accompanying drawings.

DETAILED DESCRIPTION OF EMBODIMENTS OF THE INVENTION

Figure 1:
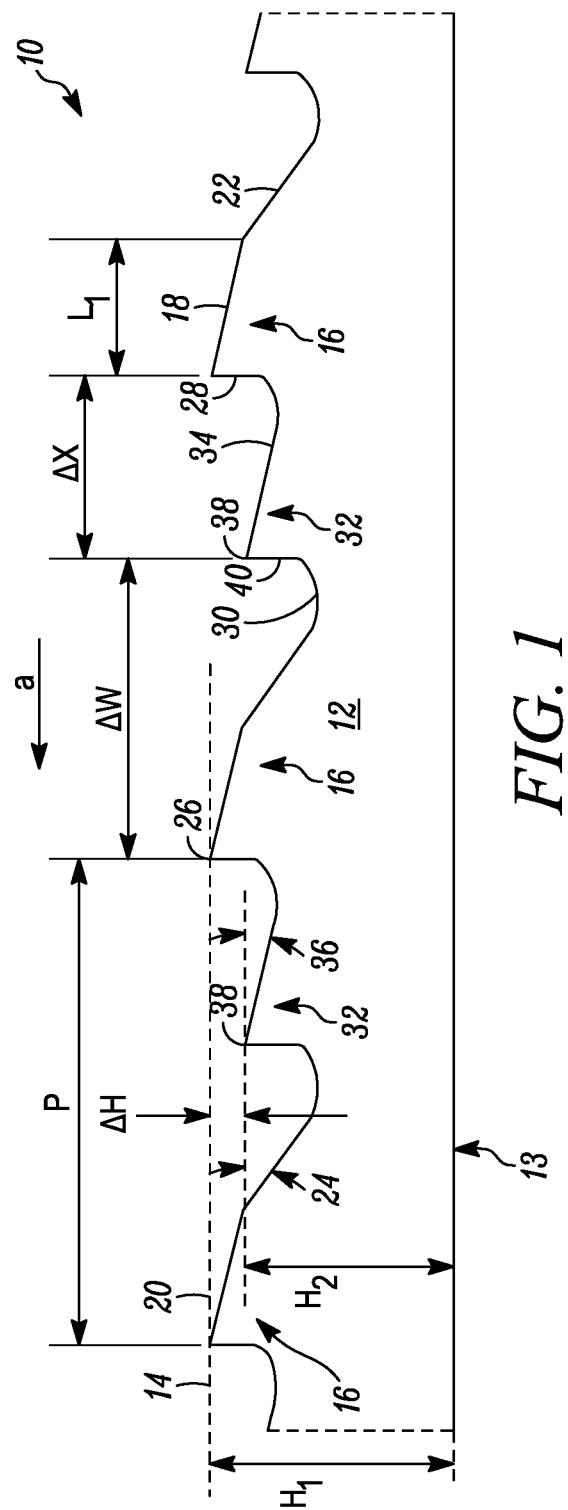
FIG. 1 is a partial, side elevational view of a reciprocating saw blade having teeth with a chip limiting feature protruding therefrom to mitigate over-feeding.
Figure 2:
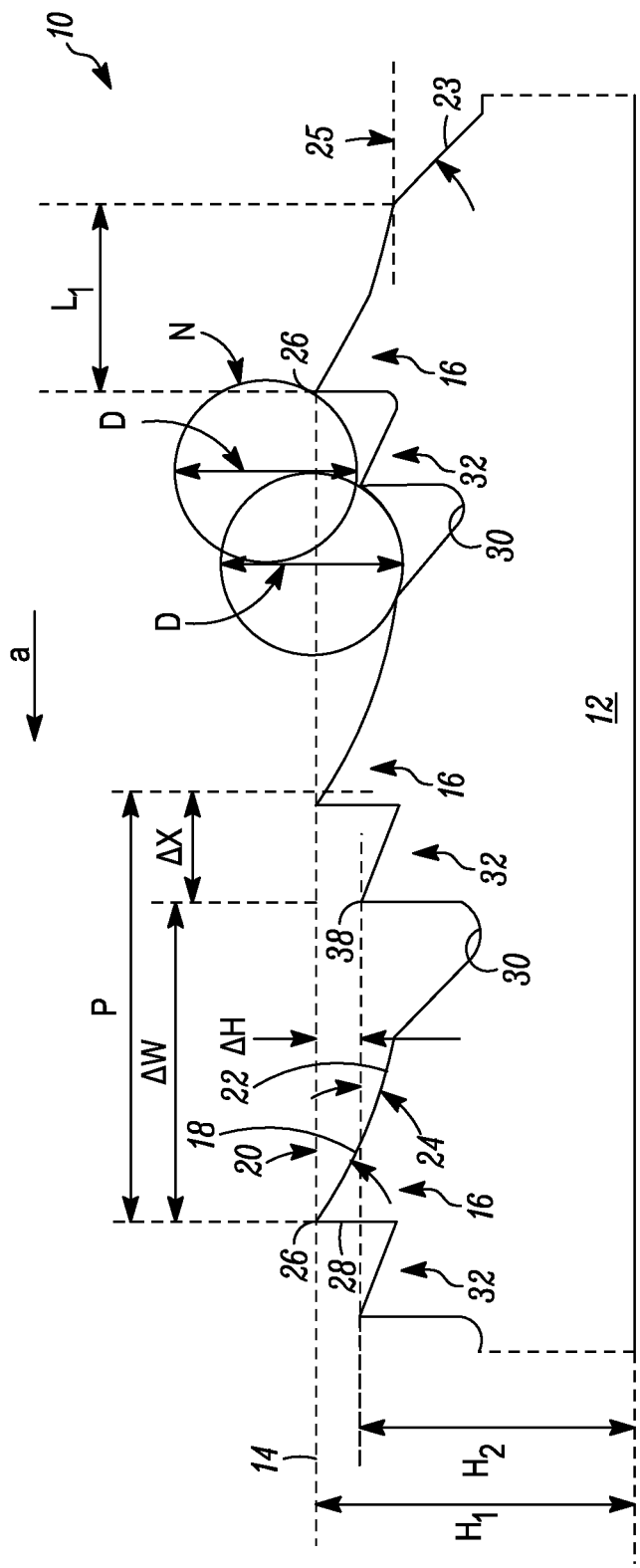
FIG. 2 is a partial, side elevational view of another embodiment of a reciprocating saw blade having a chip limiting feature as does the blade of FIG. 1, where the teeth have primary, secondary and tertiary clearance angles.

In FIG. 1, a first embodiment of a reciprocating saw blade is indicated generally by the reference numeral 10. The saw blade 10 is usable in a reciprocating saw. The saw blade 10 comprises a generally elongated blade body 12 having a back edge 13 and a cutting edge 14 extending along a cutting portion of the blade body 12 on an opposite side of the blade body 12 from the back edge 13 and defined by a plurality of cutting teeth 16, in this embodiment a repeating pattern of teeth. Each tooth 16 includes a primary clearance surface 18 defining a primary clearance angle 20 between the primary clearance surface 18 and a plane parallel to the cutting edge 14, a secondary clearance surface 22 defining a secondary clearance angle 24 between the secondary clearance surface and a plane parallel to the cutting edge 14, a tip 26, a rake face 28 located on the opposite side of the tip 26 relative to the primary clearance surface 18, and a gullet 30. In other exemplary embodiments, such as shown in FIG. 2, the respective primary teeth 16, define three (rather than two) clearance surfaces 18, 22, 23, and thus define three clearance angles, 20, 24, 25. The tooth pitch P is defined herein as the distance between the tips 26 of respective successive teeth 16. As shown in the figures, the forward or cutting direction of the blade is indicated by the arrow "a."

As should be understood by those of ordinary skill in the pertinent art, the teeth 16 are configured for their respective cutting application(s) based on, for example, the particular tooth geometries or forms (such as by setting the primary, secondary, and if applicable, tertiary, clearance surfaces and angles), the pitch or number of teeth-per-inch ("tpi"), sets, and/or the teeth heights or height differentials. Therefore, though the teeth 16 in the embodiment of FIG. 1 have the shown configuration, it should be understood by those of ordinary skill in the art that the teeth may have a different configuration, as is known or is later developed. By way of example only, though the teeth 16 in FIG. 1 have primary and secondary clearance angles and the teeth 16 in FIG. 2 have three clearance angles, the teeth may have one clearance angle or more than three clearance angles. As another example, though in FIGS. 1 and 2 the teeth 16 have no or neutral rake angle, the teeth may have a positive or negative rake angle.

In the embodiment of FIG. 1, the primary clearance surfaces 18 each extend a horizontal distance $L_1$ from the tip 26 as measured along the cutting edge 14. In some such embodiments, the horizontal distance $L_1$ is within the range of about 17% and about 44% of the tooth pitch P, such as within the range of about 25% and about 40% of the tooth pitch P. Where a tooth defines primary, secondary and tertiary clearance surfaces 18, 22, 23 such as in the embodiment of FIG. 2, the horizontal distance $L_1$ is defined as the horizontal distance spanning the length of both the primary and secondary clearance surfaces 18, 22. In such embodiments, the primary and secondary clearance surfaces together define the horizontal distance $L_1$ within the range of about 22% and about 44% of the tooth pitch P.

As also shown in FIGS. 1 and 2, each tooth 16 further includes a chip limiter 32 protruding therefrom to mitigate or substantially prevent the material being cut from entering all the way into the gullet 30, i.e., over-feeding. In the embodiment shown, the chip limiter 32 protrudes from a lower portion of the rake face 28 spaced away from the tip 26. In other embodiments the chip limiter 32 protrudes from a different portion of the tooth 16.

Each chip limiter 32 includes a relief surface 34 that intersects with the rake face 28 of the trailing tooth 16 from which the chip limiter 32 protrudes, and defines a relief angle 36 between the relief surface 34 and a plane parallel to the cutting edge 14, a tip 38, and a rake face 40. In some embodiments, each chip limiter 32 is configured to assist in the cutting effectiveness of the saw blade in addition to preventing material from entering all the way into the gullets 30. To this end, the chip limiter 32 is configured in a manner that would be understood by those of ordinary skill in the pertinent art to at least partially cut material that contacts its tip 38 and/or rake face 40, e.g., it has a sharp cutting tip/rake face. In the depicted exemplary embodiments, the relief angle 36 of a chip limiter 32 is substantially similar to the primary clearance angle 20 of the trailing tooth 16 from which the chip limiter protrudes. Accordingly, the chip limiters 32 will exhibit similar cutting characteristics. However, as may be recognized by those of ordinary skill in the pertinent art based on the teachings herein the relief angles 36 of the chip limiters 32 may be defined by any of numerous angles, similar to, or different from, the primary clearance angles of the primary teeth, depending upon the configuration of the chip limiter. For example, the relief angle may be zero, i.e., parallel to the cutting edge, or a less than zero, i.e., angled away from the back edge 13 of the blade body 12.

As shown in FIGS. 1 and 2, each tip 38 of a chip limiter 32 is located in front (in the cutting direction "a") of a trailing tooth 16 (i.e., the tooth from which the chip limiter protrudes), by a first horizontal distance $\Delta X$ along the cutting direction from the tip 26 of the trailing tooth 16. As also shown in FIG. 1, each tip 38 of a chip limiter 32 trails a tip 26 of the preceding tooth 16 (in the cutting direction "a"), by a second horizontal distance $\Delta W$. Accordingly, $\Delta W$ and $\Delta X$ together define the tooth pitch P between subsequent primary teeth 16.

The teeth 16, also define a first height $H_1$ from the back edge 13 of the blade body 12 opposite the cutting edge 14, and the chip limiters 32 define a second height $H_2$ from the back edge 13. As can be seen, the height $H_1$ of the teeth is greater than the height $H_2$ of the chip limiters, and the height differential between the teeth and the chip limiters is referred to as $\Delta H$. The height differential $\Delta H$ is present after any set. The height of a tooth/chip limiter is measured as the distance between a tip of the respective tooth/chip limiter and a selected reference plane of the blade body 12 located below the tips, here the back edge 13. Typically, heights are measured with respect to a back edge of the saw blade 10; however, as may be recognized by those of ordinary skill in the pertinent art based on the teachings herein, the heights can be measured with respect to any of numerous different reference points that are currently known or used, or later become known or used for this purpose. Further, it should be understood by those in the art that, though the figures herein show embodiments with back edges that do not have teeth, in other embodiments the back edge has teeth or a cutting edge, e.g., a double-sided saw blade.

The location and geometry of the chip limiters 32 is selected in view of the configuration of the teeth 16 described above, in order to limit, reduce, mitigate or substantially prevent the material being cut from over-feeding. For example, the first horizontal distance $\Delta X$, the second horizontal distance $\Delta W$, and the height differential $\Delta H$ are selected, based on the pitch P, the dimensions and geometry of clearance surfaces 18 and 22 (and 23 if present) and clearance angles 20, 24 (and 25 if present) of the teeth 16, so as to provide the chip limiters 32 with a length and height that permit only a limited portion of an object to fall into the gullet 30. Such object may be, for example, a foreign object embedded in the material being cut, such as a metal fastener, e.g. a nail, screw or staple, or pipe or conduit embedded in the material. Conversely, the object may be the material itself being cut, such as, for example, a pipe, wire, rod or conduit. The proportion of the object that can protrude below the cutting edge 14 between a chip limiter 32 and a trailing tooth 16 can thus be limited. Accordingly, the chip limiters 32 aid in reducing or preventing a hard object, such as a metal fastener or pipe, from over-feeding into a gullet 30, in front of and/or behind the chip limiter tip 38 (see, e.g., FIG. 2). Accordingly, the amount of material being cut by the trailing tooth 16 on a cutting stroke, e.g., thickness of the chip being formed, is controlled to an acceptable amount based on the design and materials of the blade and the material being cut. The invention therefore reduces the risk of shearing a primary tooth 16 off the blade and/or fracturing or otherwise damaging it. Likewise, by limiting the feed in front of the chip limiter 32, the risk of damage to the chip limiter 32 itself is reduced.

In view of the above, it should be understood that amount of feed depends not only upon the configuration of the chip limiters themselves, but also the configuration and geometry of the primary teeth 16 and their clearance surfaces, e.g., the clearance angles and lengths. In many instances, the configuration of the primary teeth 16 is significantly determined by the desired overall performance characteristics of the saw blade. By taking this into account when selecting the configuration of the chip limiters 32, e.g., the first horizontal distance ΔX, the second horizontal distance ΔW, and the height differential ΔH, the desired performance characteristics of the blade can be substantially maintained while at the same time reducing risk of damage. Further, as described above, if the chip limiters 32 are provided with cutting characteristics, blade performance can be improved.

The inventors have discovered that, in certain exemplary embodiments, such as shown in FIG. 1, a first distance ΔX within the range of about 22% to about 44%, such as about 27% to about 40%, of the tooth pitch P, in combination with a height differential ΔH within the range of about 8% to about 20%, such as within the range of about 9% to about 18%, of the tooth pitch P aids in mitigating or substantially preventing a hard object, such as a metal fastener embedded in the material being cut, e.g., a nail, screw, or staple, or a pipe being cut, from over-feeding into a gullet 30 and fracturing a tooth 16. In some such exemplary embodiments, the first distance ΔX is within the range of about 40% to about 65% of the second distance ΔW, and ΔW is within the range of about 30% to about 40% of the pitch P.

In other exemplary embodiments, such as shown in FIG. 2, the respective teeth 16, define three (rather than two) clearance surfaces 18, 22, 23, and thus define three clearance angles, 20, 24, 25, where the secondary clearance angles 24 of the teeth 16 are relatively shallower than the secondary clearance angles 24 of the teeth 16 of the embodiment of FIG. 1. Accordingly, the respective first and second horizontal distances ΔX, ΔW, and the respective height differentials ΔH, are different in the embodiment of FIG. 2 than those of the embodiment of FIG. 1. Specifically, due to the shallower secondary clearance angles 24 and thus the shallower secondary clearance surfaces 34 in FIG. 2, the first horizontal distances ΔX and the height differentials ΔH are generally relatively smaller in the embodiment of FIG. 2 than those of the embodiment of FIG. 1. Due to that, the inventors have discovered that, in such an exemplary embodiment, a first distance ΔX that is within the range of about 30% to about 40%, such as about 33% to about 37% of the second distance ΔW, and ΔW is within the range of about 70% to about 80%, such as about 71% to about 77%, of the pitch P, in combination with a height differential ΔH within the range of about 5% to about 18% of the pitch P, also successfully aids in mitigating or preventing a hard object, such as a nail or screw embedded in the material being cut, or a pipe being cut, from over-feeding into a gullet 30. In other embodiments, the first distance ΔX is about 25% of the second distance ΔW.

Testing performed by the current inventors has shown that the features of the above-described embodiments provide that no more than about 30% of the diameter, D, of a metal fastener or pipe having a diameter D of at least about 40% of the pitch protrudes into the gullet 30 below the tip 38 of a chip limiter 32 between a leading tooth 16, and a trailing chip limiter 32 (in the cutting direction "a"). Thereafter, no more than about 30% of the diameter, D, of the metal fastener or pipe N protrudes below the cutting edge 14 upon contact with the trailing tooth 16, from which the chip limiter 32 extends. For example, as shown in FIG. 2, less than about 30% of the diameter D of the metal fastener or pipe N is located below the tip 38 of the chip limiter 32, within the gullet 30 (between a leading tooth 16 and a trailing chip limiter 32). Thereafter, less than about 30% of the diameter D of the metal fastener or pipe N protrudes below the cutting edge 14, upon contact with the tip 26 of the trailing tooth 16 (from which the chip limiter extends). The inventors have found that when less than about 50% of an object, such as a metal fastener embedded in the material being cut, or pipe being cut, protrudes below the cutting edge 14 upon contact with the tip 26 of the tooth 16, the object will "roll off" of the tooth 16, i.e., slide up and over the tooth 16, as it is cut, reducing the risk of shearing the tooth 16 off the blade and/or damage it.

As should be recognized by those of ordinary skill in the art, other combinations of the first horizontal distance ΔX, the second horizontal distance ΔW and the height differential ΔH may also be utilized to reduce overfeeding for a given configuration of the primary teeth 16 and the cutting application. That is, for any particular geometry of the primary teeth 16 (height, rake angle, etc.) and their clearance surfaces (relief angle, length, etc.), a number of different combinations of the first horizontal distance Δ, the second horizontal distance ΔW and the height differential ΔH can provide the feed-limiting benefits of the invention. Thus, as those in the art will understand, the embodiments described herein are only exemplary in nature, and the invention includes configurations, geometries and dimensions that may be outside of those specifically described.

For example, where the blade is used to cut a hollow material such as a pipe, conduit or structural member, the relevant parameter is not the percentage of the material that falls below the cutting edge, but the amount of the material cut during a cutting stroke, e.g., chip thickness. For such applications, the first horizontal distance ΔX, the second horizontal distance ΔW and the height differential ΔH are selected as described herein to limit the amount the material that is fed to an acceptable amount for the blade being used.

Figure 3:
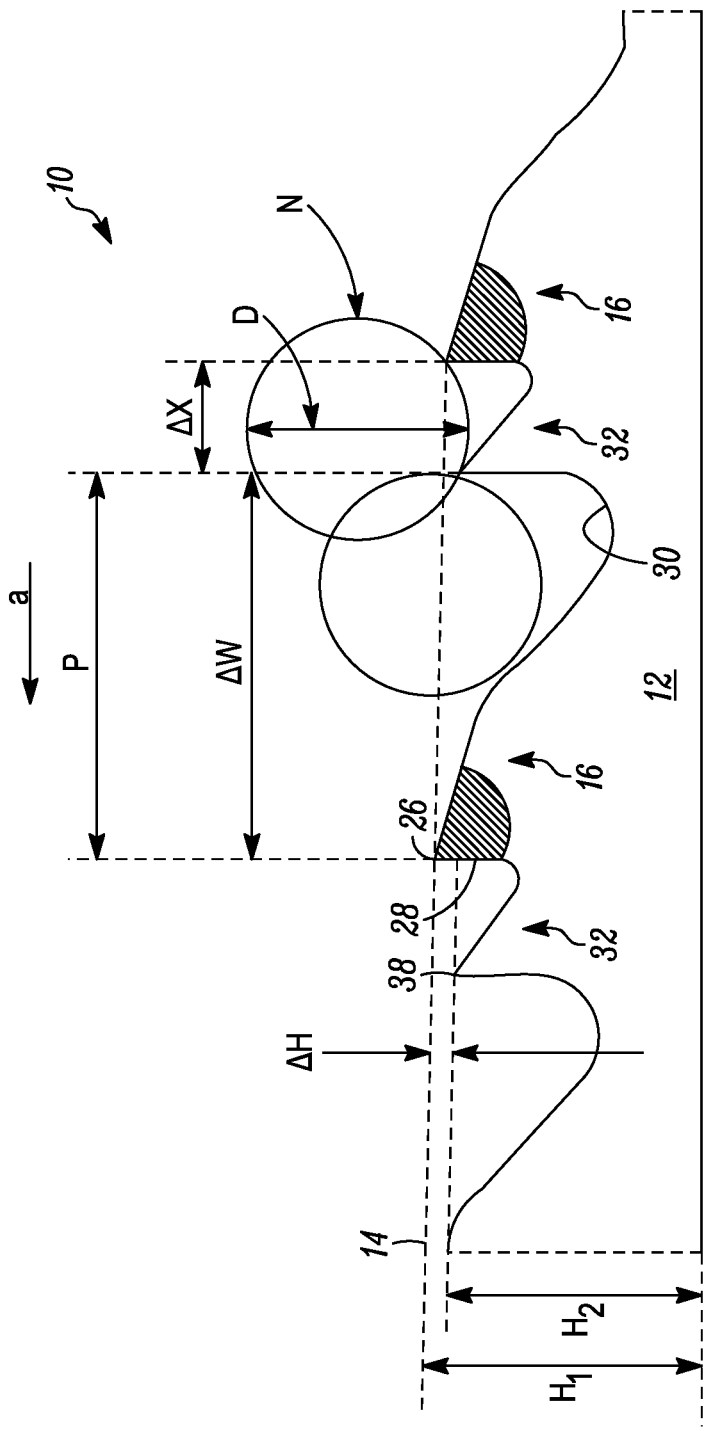
FIG. 3 is a partial, side elevational view of a reciprocating saw blade having a chip limiting feature as do the blades of FIGS. 1 and 2, but wherein the teeth have tips containing specialty material.

In embodiments where specialty materials are used, however, such as saw blades having tips containing diamond, cermet (ceramic and metal), or carbide material or having a coating, e.g., a physical vapor deposition (PVD) or chemical vapor deposition (CVD) coating, the inventors have determined that it is beneficial if the harder and/or more brittle material of the tips 26 of the teeth 16 are exposed to even less hard objects, such as a nail embedded in the material being cut, or a pipe being cut, than a steel or bi-metal blade tip. In such embodiments, the height differential ΔH between the height $H_1$ of the specialty-tipped teeth and the height $H_2$ of the corresponding chip limiter is reduced. As shown in the exemplary embodiment of FIG. 3, the height differential ΔH between the height $H_1$ of the specialty-tipped teeth 16 (depicted as black tips) and the height $H_2$ of the chip limiters 32 is within the range of about 3% to about 10% of the pitch P between two successive teeth, such as within the range of about 3% to about 6%. This reduced ΔH, in combination with the first horizontal distance ΔX that the chip limiter 32 protrudes from the trailing tooth tip 26, further reduces the exposure of the tooth 16 to the hard object, as schematically shown in FIG. 3.

Those of ordinary skill in the art should understand that the height differential ΔH between the primary teeth 16 and chip limiters 32 can be affected over time because of different wear rates between the teeth 16 and the chip limiters 32. At least in the embodiment shown in FIG. 3, the teeth tips 26 are made of a different material than the tips 38 of the chip limiters 32 and thus can wear differently for this reason alone. The material at the tip 26 is a more wear-resistant material than the steel/bi-metal of the chip limiter tips 38. However, the different cutting characteristics of, and cutting force applied by, the chip limiters 32 as compared to the teeth 16, one factor in which can be the lower height/height differential of the chip limiters 32, also affect the relative wear rates. For example, because the chip limiters 32 define a lower height $H_2$ than the height $H_1$ of the teeth 16, they nominally cut less and wear slower than the teeth 16. Thus, different wear rates can occur even if made of the same material.

Different wear rates alter the height differential $\Delta H$ over time and thus the geometry determining the permitted feed into the gullet. For example, if the chip limiter tip 38 wears faster than the tooth tip 26, the work piece would begin to gradually feed deeper into the saw blade over the life of the blade, exposing the tooth tip 26 to a higher risk of damage upon excessive contact with a hard object, such as a screw or nail embedded in the material being cut, or a pipe being cut. Conversely, if the tooth tip 26 wears faster than the chip limiter tip 38, the chip limiter 32 would reduce the feed to the tooth 16, reducing cutting efficiency, and then at some point along the life of the blade, the chip limiter 32 would begin to obstruct the tooth 16 from cutting.

Thus, in some embodiments, the chip limiters 32 are configured to wear substantially consistently with the teeth 16, to substantially maintain the height differential $\Delta H$ therebetween within a desired range, e.g., the ranges described above. One way to achieve this is by the selection of the chip limiter 32 geometry. For example, if because the chip limiters 32 define a lower height $H_2$ than the height $H_1$ of the teeth 16, and thus cut less, they would wear slower than the teeth 16 if they otherwise had the same geometry, the chip limiters 32 may be shaped to define steeper clearance angles 36 than those on the teeth 16 to provide more balanced wear. Conversely, the clearance angles 36 can be made shallower than the those on the teeth 16 in situations where the chip limiter 32 would otherwise wear faster. Alternatively, or in addition, the initial height differential $\Delta H$ can be selected (along concomitant selection of other dimensions, such as, for example, the first horizontal distance $\Delta X$ and the second horizontal distance $\Delta W$, to provide the desired feed geometries as discussed above) to provide substantially consistent wear rates. As should be understood by those of ordinary skill in the pertinent art, the combination of clearance angles 36 (progressively increased wear with steeper angles) and the heights $H_2$ (progressively decreased wear for lower heights) of the chip limiters 32, can be adjusted for overall substantially consistent wear with the teeth 16. Those in the art should also understand that any other factors that are known to affect wear, including but not limited to rake angle, can be utilized to balance wear between the primary teeth 16 and the chip limiters 32. For example, the hardness of the chip limiter 32 material can be adjusted relative to the hardness of the primary tooth 16 material to establish substantially consistent wear between the chip limiters and the teeth.

Another way to balance wear between the primary teeth 16 and the chip limiters 32 is to utilize materials in the chip limiters, e.g., the tips 38, that, based on the geometry of the toothform(s), will wear at substantially the same rate as the tips 26 of the primary teeth 16. In some embodiments, then, different materials are used. In yet other embodiments, the same or similar materials can be used for all the cutting elements. For example, in embodiments containing tips with specialty materials, similar materials, e.g., diamond, cermet, carbide or coatings, can respectively be used for the chip limiters 32.

The presence of the chip limiter 32 to substantially prevent over-feeding allows the primary teeth 16 to have steeper primary clearance angles 20 than previously-known blades for increased cutting efficiency and longer blade life without sacrificing blade durability. For example, in the above-illustrated embodiments, the primary clearance surfaces 18 of the teeth 16 define primary clearance angles 20 within the range of about 24 degrees and about 37 degrees, and in some embodiments, to about 30 degrees. Without the chip limiter feature of the invention, teeth with these angles would be more susceptible to damage upon impact with hard materials, e.g., nails.

Figure 4:
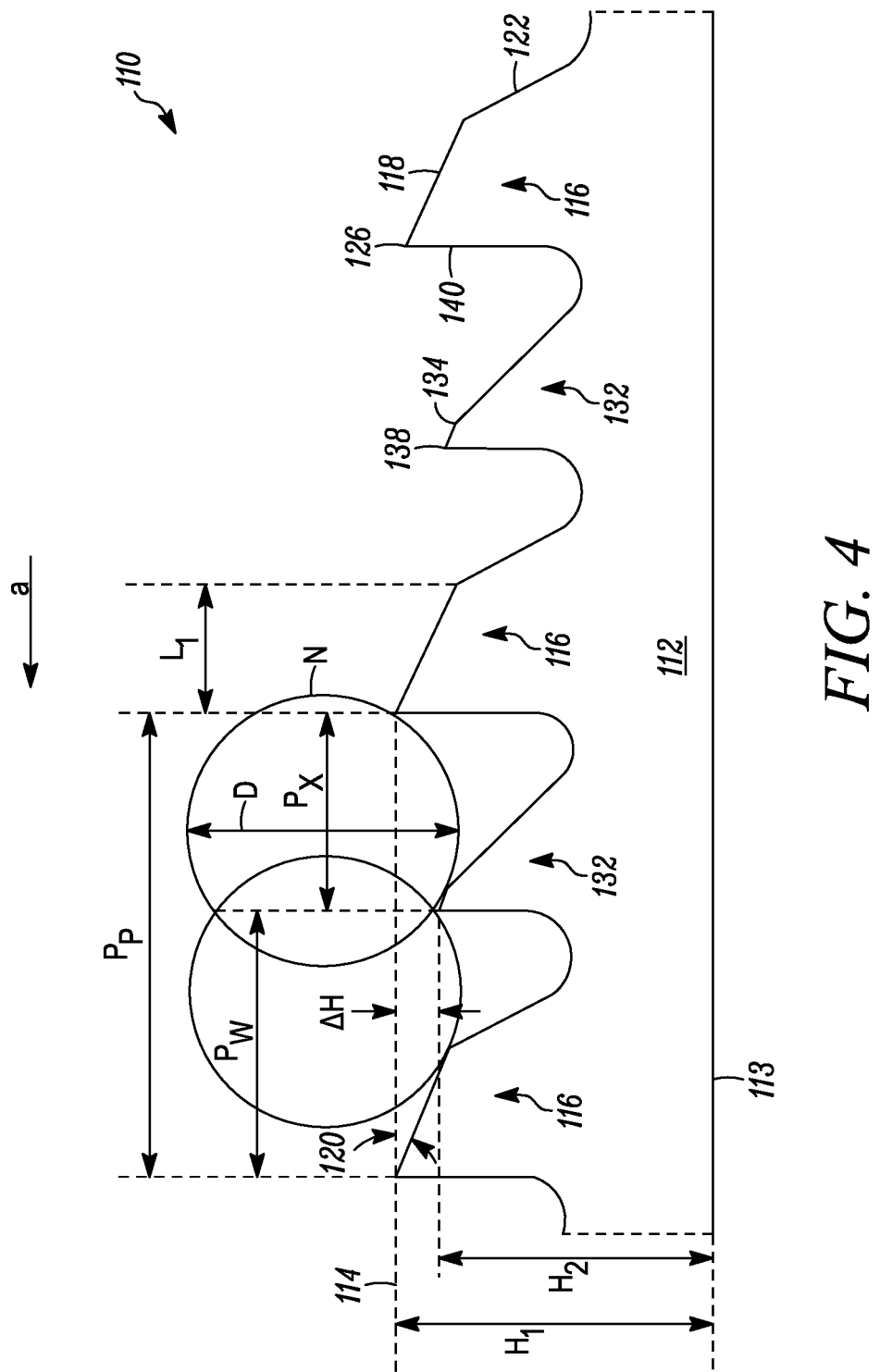
FIG. 4 is a partial, side elevational view of another embodiment of a reciprocating saw blade, having secondary teeth located within the gullets of the primary teeth to mitigate over-feeding.
Figure 5:
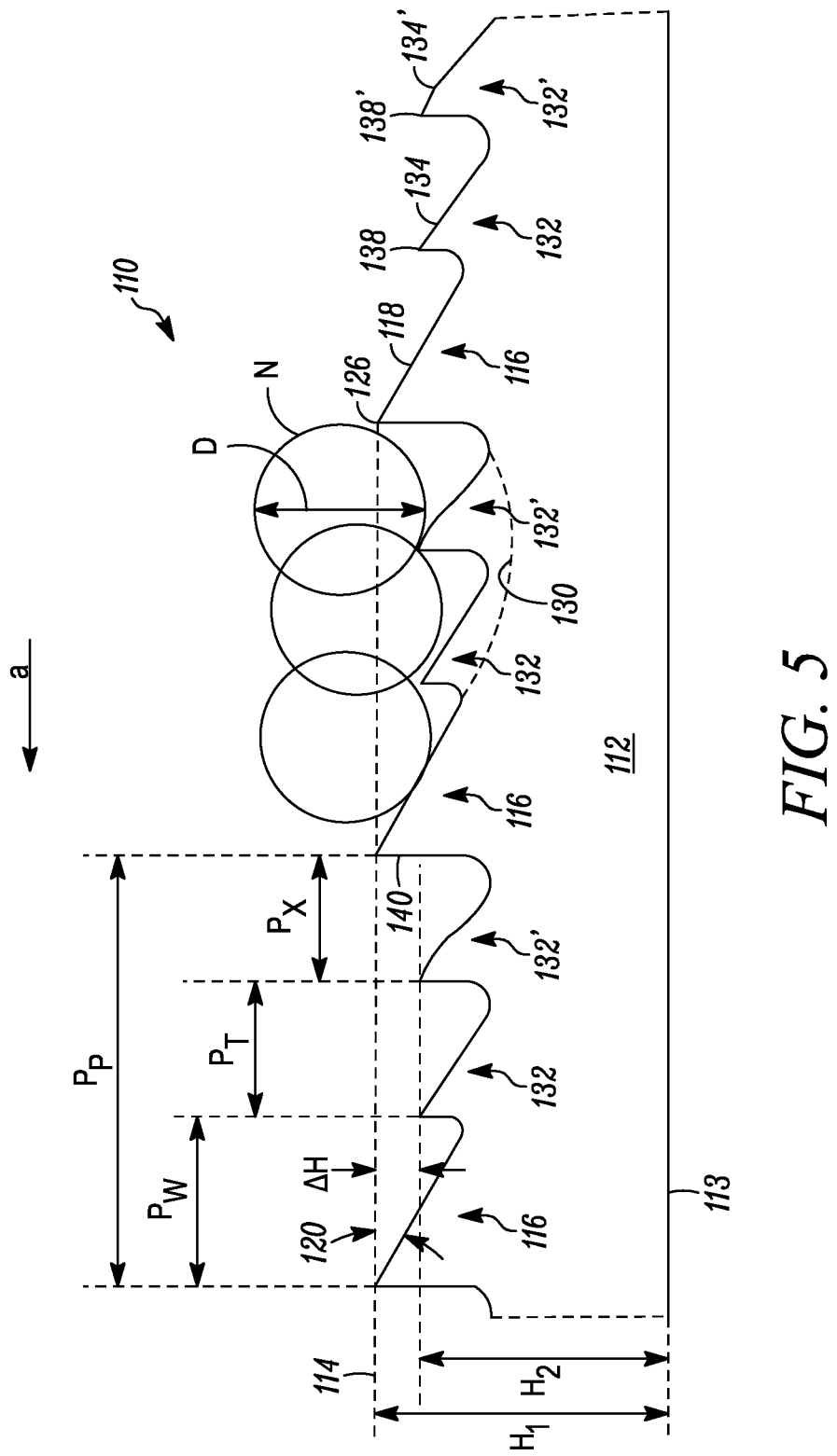
FIG. 5 is a partial, side elevational view of another embodiment of a reciprocating saw blade having secondary teeth as does the blade of FIG. 4, but having a variable pitch toothform.
Figure 6:
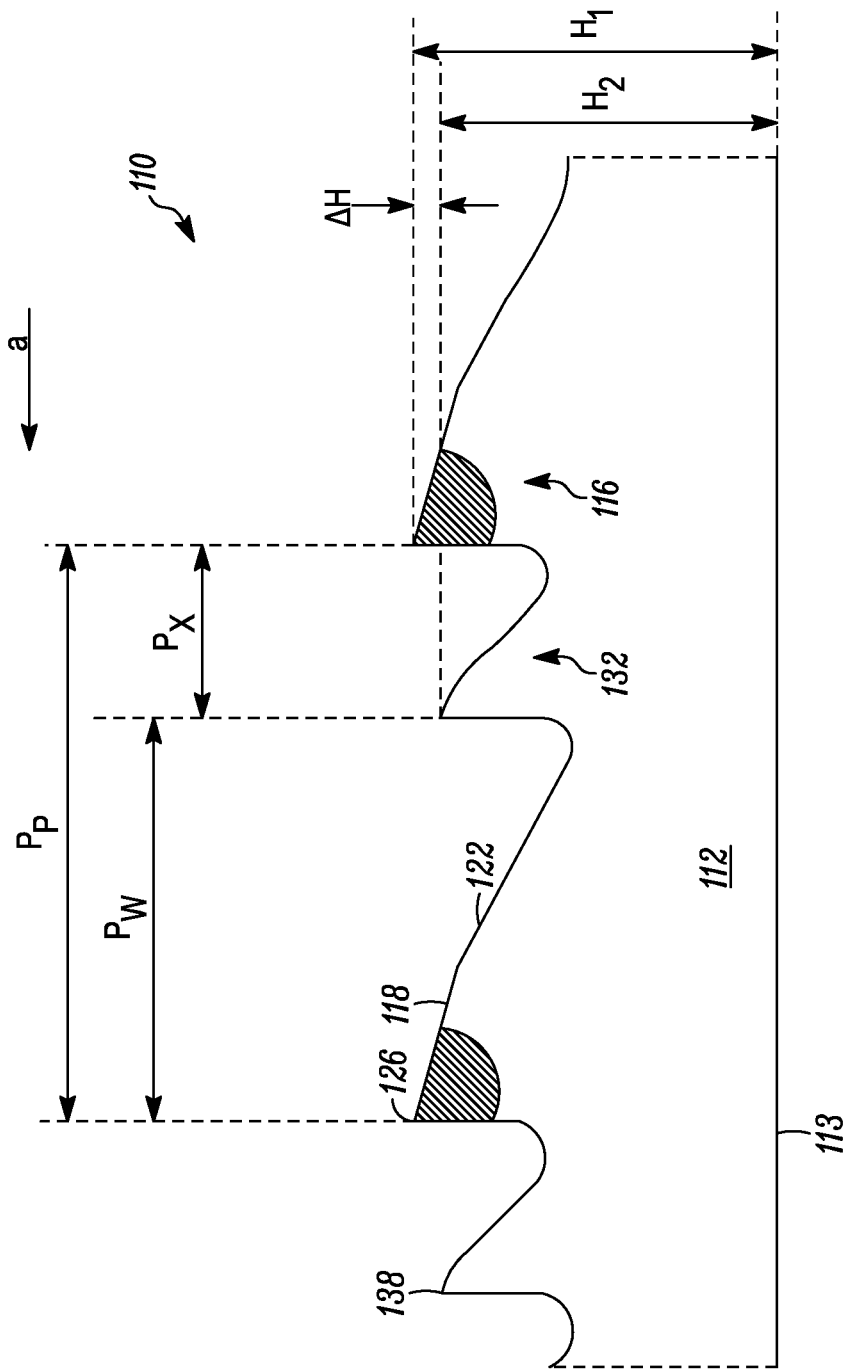
FIG. 6 is a partial, side elevational view of another embodiment of a reciprocating saw blade having secondary teeth as do the blades of FIGS. 4 and 5, wherein the primary teeth have tips containing specialty material.

In FIGS. 4-6, other embodiments are indicated generally by the reference numeral 110. The saw blades 110 are similar in a number of aspects to the saw blades 10 described above in connection with FIGS. 1-3, and therefore like reference numerals preceded by the numeral "1" are used to indicate like elements. A difference of the saw blades 110 in comparison to the saw blade 10 is that the saw blades 110 do not have the same chip limiters, but have secondary teeth 132 located between the primary teeth 116 or within and/or protruding from the gullets 130 of the primary teeth 116 as hereinafter described.

As shown in the embodiments of FIGS. 4-6, the secondary teeth 132 extend from the blade body 112 rather than protrude from the face 140 of the respective trailing primary teeth 116 as do the chip limiters 32 in the embodiments of FIGS. 1-3. Similar to the chip limiters 32, the configuration of the secondary teeth 132 limit, and in some cases, substantially prevent, the material being cut from over-feeding into the gullet 130. The secondary teeth 132 are also configured, in a similar manner to the chip limiters 32, to assist the primary teeth 116 in cutting.

In some such embodiments, the saw blade 110 includes a single secondary tooth 132 between successive primary teeth 116. As shown in FIG. 4, the teeth 116, 132 define a variable pitch toothform. A primary pitch $P_P$ is defined as the horizontal distance between the tips 126 of successive primary teeth 116. A secondary pitch $P_X$ is defined as the horizontal distance between a tip 138 of a secondary tooth 132 and the tip 126 of the trailing primary tooth 116. As also shown in FIG. 4, each tip 138 of a secondary tooth 132 trails a tip 126 of the preceding primary tooth 116 (in the cutting direction "a"), by a pitch $P_W$. Accordingly, pitches $P_W$ and $P_X$ together define the tooth pitch $P_p$ between subsequent primary teeth 116.

In other embodiments, the saw blade 110 includes two or more secondary teeth 132, 132' between successive primary teeth 116. In some such embodiments, a variable pitch toothform is utilized, as shown in FIG. 5. In such a configuration, the primary pitch $P_P$ is still defined as the distance between the tips 126 of successive primary teeth 116. A tertiary pitch $P_T$ is defined as the horizontal distance between the tip 138 of the leading secondary tooth 132 and the tip 138' of the trailing secondary tooth 132' (along the cutting direction "a") within a gullet 130. The secondary pitch $P_X$ is defined as the horizontal distance between the tip 132' of the trailing secondary tooth 132' and the tip 126 of the trailing primary tooth 116. In such embodiments, $P_W$ is defined as the horizontal distance between the tip 138 of the leading secondary tooth 132 and the tip 126 of the preceding primary tooth 116 (along the cutting direction "a"). Thus $P_W$, $P_T$ and $P_X$, together define the primary tooth pitch $P_P$ in such embodiments.

As should be recognized by those of ordinary skill in the pertinent art based on the teachings herein, multiple secondary teeth (more than 2) may be employed between successive primary teeth and configured in a variable pitch toothform to substantially prevent material being cut from over-feeding into the gullet 130. As should also be recognized, other embodiments utilizing different pitches, including a uniform pitch, may also be utilized.

As shown in FIGS. 4-6, there is a height differential ΔH between the height $H_1$ of the primary teeth 116 and the height $H_2$ of the secondary teeth 132 (and 132' if present), similarly to the above-described embodiments of FIGS. 1-3. The height of the primary and secondary teeth is measured as the distance between a tip of the respective primary/secondary tooth and a selected reference plane of the blade body 112 located below the tips, here, the back edge 113.

Similarly to the embodiments of FIGS. 1-3, $P_X$ and $P_W$ (and $P_T$ if present), along with the height differential ΔH, are selected according to the primary pitch $P_P$, clearance surfaces 118 and clearance angles 120, so as to provide the secondary teeth 132 (and 132' if present) at a position within the gullet 130, and with a height, that permits only a limited portion of an object, e.g., a nail, screw, or pipe to fall into a gullet 130, and also to subsequently limit the portion of the object which can protrude below the cutting edge 114 between a secondary tooth 132 (or 132' if present) and a trailing primary tooth 116. Therefore, the combination of $P_X$ and $P_W$ (and $P_T$ if present), along with the height differential ΔH, aid in mitigating or preventing a hard object, such as a nail, screw, or pipe from over-feeding into a gullet 130, either in front of or behind the secondary tooth 132 (and 132' if present), and shearing a primary tooth 116 off the blade and/or damaging or fracturing it.

The inventors have discovered that, in certain exemplary embodiments where a single secondary tooth 132 extends from the blade body 112 within a respective gullet 130, such as shown in FIG. 4, a secondary pitch $P_X$ within the range of about 20% to about 44% of the primary pitch $P_P$, in combination with a height differential ΔH within the range of about 6% to about 30%, such as within the range of about 6% to about 20%, of the primary pitch $P_P$, aids in mitigating or substantially preventing a hard object, e.g., a nail, screw, or pipe from over-feeding into a gullet 130 and impacting a primary tooth 116.

In other exemplary embodiments, where more than one secondary tooth 132 extends from the blade body 112 within a respective gullet 130, such as shown in FIG. 5 where two secondary teeth 132, 132' extend from the blade body 112 within a respective gullet 130, the pitches $P_X$ and $P_W$ are different from those of the embodiment of FIG. 4 (where each gullet 130 only includes one secondary tooth 132). Specifically, due to the inclusion of the tertiary pitch $P_T$, the pitches $P_X$ and $P_W$ are relatively smaller in the embodiment of FIG. 5 than those of the embodiment of FIG. 4. The inventors have discovered that, in such an exemplary embodiment, the secondary and tertiary pitches, $P_X$, $P_T$, each within the range of about 15% to about 35% of the primary pitch $P_p$, in combination with a height differential ΔH within the range of about 6% to about 30% of the primary pitch $P_p$, aids in mitigating or substantially preventing a hard object from over-feeding into a gullet 130 and fracturing a primary tooth 116. Similar as with embodiments containing a chip limiter, other height differentials and pitches $P_X$, $P_W$ and $P_T$ (if present) may also be utilized to reduce overfeeding, depending upon the pitch $P_P$, the configuration of the primary teeth 116, including their height $H_1$, the secondary teeth 132 (and 132' if present), and other design parameters of the blade, as will be appreciated by those of ordinary skill in the art. In some such embodiments, similarly to embodiments containing a chip limiter, for example, those shown in FIGS. 1-3, the secondary teeth 132 (and 132' if present) may also be designed to wear consistently with the primary teeth 116 to substantially maintain the height differential ΔH therebetween.

Testing performed by the current inventors has shown that the features of the above-described embodiments provide that no more than about 30% of the diameter, D, of a metal fastener or pipe having a diameter D of at least about 40% of the pitch will be located below the cutting edge 114 upon contact with a tooth 116. For example, as shown in FIG. 5, less than 30% of the diameter D of the metal fastener or pipe N is located below the cutting edge 114, upon contact with the tip 126 of the tooth 116. Accordingly, such a nail will "roll off" of the tooth 116, i.e., slide up and over the tooth 116, as it is cut, reducing the risk of shearing the tooth off the blade and/or damaging/fracturing it.

As explained above with respect to the embodiments of FIGS. 1-3, where a specialty material is used with the tips 126, the pitch(es) and height differential(s) may be selected so that the harder and/or more brittle material at the tips (depicted as black tips) of the primary teeth 116 are exposed to even less of the hard object, such as a metal fastener embedded in the material being cut, or a pipe being cut. As shown in FIG. 6, for example, the height differential ΔH between the height $H_1$ of the primary teeth 116 and the height $H_2$ of the secondary teeth 132 (and 132' if present) is reduced compared to the embodiments of FIGS. 4 and 5. In the illustrated embodiment, the height differential ΔH is within the range of about 3% to about 10%, of the primary pitch $P_P$, such as within the range of about 3% to about 6%.

It should be understood that the terms "about," "approximately" and like terms used herein when referring to a dimension or characteristic of blades of the invention indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

As may be recognized by those of ordinary skill in the pertinent art based on the teachings herein, numerous changes and modifications may be made to the above-described and other embodiments of the present invention without departing from its scope as defined in the claims. For example, the saw blade may equally take the form of another type of saw blade, currently known or that later becomes known, such as, for example a hole saw blade, circular saw blade, band saw blade or hack saw blade. As another example, the tooth design of the saw blade may incorporate both standard teeth, i.e., primary and secondary teeth as described herein, as well as teeth having chip limiters as described herein. Further, as is known by those of ordinary skill in the pertinent art, since the chip limiters/secondary teeth assist in cutting in addition to preventing over-feeding, a set pattern may be employed, such as an alternate or raker set pattern, to the teeth/primary teeth and the chip limiters/secondary teeth of the saw blade described. For example, the teeth/primary teeth and the chip limiters/secondary teeth can be set in the same direction and to the same set magnitude. Alternatively, the chip limiters/secondary teeth may be set to a higher or lower set magnitude than the teeth/primary teeth. As another example, teeth/primary teeth may be unset and the chip limiters/secondary teeth may be set. As yet another example, the secondary teeth/chip limiters may lie in the same or substantially the same plane as the teeth/primary teeth, e.g., have no set. Accordingly, this detailed description of embodiments is to be taken in an illustrative, as opposed to a limiting sense.

What is claimed is:

1. A saw blade comprising:
   a blade body having a back edge, a cutting edge located on an opposite side of the blade relative to the back edge, the cutting edge defined by a plurality of cutting teeth, the plurality of cutting teeth further defining and a cutting direction of the blade, and a plurality of gullets each between successive cutting teeth, each tooth of the cutting teeth configured to cut a material to be cut at least when moved through the material in the cutting direction and defining a tip, a height thereof, at least one clearance surface extending from the tip in a direction opposite the cutting direction, a rake face on an opposite side of the tip relative to the at least one clearance surface and extending from the tip toward a respective one of said plurality of gullets, wherein said tips of the cutting teeth define the cutting edge, and a distance along the cutting edge between successive cutting teeth tips in the cutting direction defines a pitch thereof; and a plurality of chip limiters, each projecting from a respective trailing tooth in the cutting direction for a first distance as measured along the cutting edge in the cutting direction from the tip of the respective trailing tooth to a tip of the chip limiter, wherein each chip limiter defines the tip, a height thereof, a relief surface extending from the chip limiter tip toward the rake face of the respective trailing tooth, and a chip limiter rake face located on the opposite side of the chip limiter tip relative to the relief surface and extending from the chip limiter tip toward the respective one of said plurality of gullets, wherein:

the height of the tooth tip is greater than the height of the chip limiter, the first distance is one or more of (i) within a range of about 22% to about 44% of the pitch and (ii) within the range of about 30% to about 40% of a second distance along the cutting edge, defined between the chip limiter tip and the tip of the respective preceding tooth in the cutting direction; and each chip limiter is configured to (i) upon contact of an object with the respective trailing tooth, substantially prevent more than about 50% of the object from protruding beyond the cutting edge toward the respective one of said plurality of gullets and (ii) at least partially cut the material that contacts the chip limiter tip.

2. A saw blade as defined in claim 1, wherein the first distance is within a range of about 27% to about 40% of the pitch.

3. A saw blade as defined in claim 1, wherein the first distance is within the range of about 22% to about 44% of the pitch, and a height differential between the height of the tooth tip and the height of the chip limiter is within a range of about 8% to about 20% of the pitch.

4. A saw blade as defined in claim 3, wherein the height differential is within a range of about 9% to about 18% of the pitch.

5. A saw blade as defined in claim 1, wherein the cutting teeth tips comprise one or more of a coating, carbide, cermet or diamond material.

6. A saw blade as defined m claim 1, wherein the chip limiter is configured to substantially prevent more than about 30% of an object having a diameter of at least about 40% of the pitch from contacting the respective trailing tooth.

7. A saw blade as defined in claim 1, wherein the at least one clearance surface includes a primary clearance surface defining a primary clearance angle within the range of about 24 degrees to about 37 degrees.

8. A saw blade as defined in claim 7, wherein the primary clearance surface spans a clearance surface distance along the cutting edge within the range of about 17% to about 44% of the pitch.

9. A saw blade as defined in claim 8, wherein the clearance surface distance is within the range of about 25% to about 40% of the pitch.

10. A saw blade as defined in claim 1, wherein the relief surface defines a relief angle within the range of about 20 degrees to about 37 degrees.

11. A saw blade comprising a blade body having a back edge, a plurality of primary cutting teeth defining a cutting edge located on an opposite side of the blade relative to the back edge and a cutting direction, and a plurality of gullets each between successive primary cutting teeth, each tooth of the primary cutting teeth configured to cut a material to be cut at least when moved through the material in the cutting direction and defining a tip, a height thereof, at least one clearance surface extending from the tip in a direction opposite the cutting direction, a rake face on an opposite side of the tip relative to the at least one clearance surface and extending from the tip toward a respective one of said plurality of gullets, wherein said primary teeth tips define the cutting edge, a distance along the cutting edge between successive primary teeth tips in the cutting direction defines a primary pitch thereof; and a plurality of first means for substantially preventing more than about 50% of an object in the material from protruding beyond the cutting edge toward the respective one of said plurality of gullets upon contact with the respective trailing primary tooth, the first means including second means for at least partially cutting the material that contacts the second means.

12. A saw blade as defined in claim 11, wherein the first means comprises a chip limiter projecting from a respective trailing tooth in the cutting direction a first distance along the cutting edge as measured in the cutting direction from the tip of the respective trailing tooth to a chip limiter tip of the chip limiter, and the second means comprises the chip limiter tip defining a height thereof, and the chip limiter further defines a relief surface extending from the chip limiter tip toward the rake face of the respective trailing tooth, and a chip limiter rake face located on the opposite side of the chip limiter tip relative to the relief surface and extending from the chip limiter tip toward the respective one of said plurality of gullets, wherein:

the height of the tooth tip is greater than the height of the chip limiter, and the first distance is one or more of (i) within a range of about 22% to about 44% of the pitch and (ii) within the range of about 30% to about 40% of a second distance along the cutting edge, defined between the chip limiter tip and the tip of the respective preceding tooth in the cutting direction.

* * * * *